(12) United States Patent
White et al.

(10) Patent No.: US 10,759,244 B2
(45) Date of Patent: Sep. 1, 2020

(54) SUSPENSION SYSTEM INCLUDING RELEASABLE CONNECTION

(71) Applicant: Ford Global Technologies, LLC, Dearborn, MI (US)

(72) Inventors: Brent Michael White, Highland, MI (US); Christopher Melgar, Royal Oak, MI (US); Peter Lazarevski, Dearborn, MI (US); Kevin Stanton Giaier, Sylvan Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 120 days.

(21) Appl. No.: 16/172,955

(22) Filed: Oct. 29, 2018

(65) Prior Publication Data

US 2020/0130444 A1 Apr. 30, 2020

(51) Int. Cl.
*B60G 7/00* (2006.01)
*B60G 3/18* (2006.01)

(52) U.S. Cl.
CPC .............. *B60G 7/001* (2013.01); *B60G 3/18* (2013.01); *B60G 2204/143* (2013.01); *B60G 2204/41* (2013.01); *B60G 2204/4302* (2013.01); *B60G 2206/016* (2013.01)

(58) Field of Classification Search
CPC .......... B60G 2206/016; B60G 2206/12; B60G 2206/122; B60G 3/02; B60G 3/06; B60G 3/18; B60G 3/20; B60G 7/02; B60G 7/001; B60G 2204/143; B60G 2204/1431; B60G 2204/40; B60G 2204/41; B60G 2204/4302; B60G 2200/142; B60G 2200/1424; B60G 2200/154; B60G 2200/156; B60R 2021/0009; B60R 2021/0023; B62D 21/11; B62D 21/15; B62D 21/152; B62D 21/155
See application file for complete search history.

(56) References Cited

U.S. PATENT DOCUMENTS

| 6,705,627 | B2 * | 3/2004 | Hasebe | B60G 7/02 280/124.134 |
| 6,994,374 | B2 * | 2/2006 | Miyasaka | B60G 7/02 280/784 |
| 8,628,139 | B2 * | 1/2014 | van Oirschot | B62D 21/155 296/187.09 |
| 8,857,555 | B2 | 10/2014 | Paintmayer et al. | |
| 9,004,504 | B2 * | 4/2015 | Holman | B62D 55/116 180/9.5 |
| 9,067,469 | B2 * | 6/2015 | Asjad | B60G 17/0165 |

(Continued)

FOREIGN PATENT DOCUMENTS

| DE | 102016202055 A1 | 8/2017 |
| JP | 2004009893 A * | 1/2004 |

(Continued)

*Primary Examiner* — Laura Freedman
(74) *Attorney, Agent, or Firm* — Raymond L. Coppiellie; Bejin Bieneman PLC

(57) ABSTRACT

A vehicle includes a vehicle frame and a suspension arm. A bushing is connected to the suspension arm. A lever extends through the bushing. A fastener is fastened to the lever and the vehicle frame. When the lever is impacted by a rigid barrier of a small-offset rigid-barrier (SORB) frontal impact test, the lever breaks the fastener and allows the lever, the bushing, and the suspension arm to release from the vehicle frame.

17 Claims, 8 Drawing Sheets

(56) References Cited

U.S. PATENT DOCUMENTS

| | | | | |
|---|---|---|---|---|
| 9,079,619 B2* | 7/2015 | Gupta | ............... | B62D 21/157 |
| 9,120,507 B1* | 9/2015 | Alwan | ............... | B62D 21/152 |
| 9,174,679 B2* | 11/2015 | Klamser | ............... | B60R 19/40 |
| 9,187,053 B2* | 11/2015 | Nusier | ............... | B60R 19/34 |
| 9,216,766 B2* | 12/2015 | Kerstan | ............... | B60B 35/00 |
| 9,580,108 B2* | 2/2017 | Mentzel | ............... | B60G 13/005 |
| 9,592,854 B2 | 3/2017 | Ishii | | |
| 9,623,712 B2* | 4/2017 | Sakaguchi | ............... | B60G 7/001 |
| 9,676,241 B2 | 6/2017 | Eleazar | | |
| 9,884,648 B1* | 2/2018 | Grattan | ............... | B62D 21/02 |
| 9,975,389 B2* | 5/2018 | Koetzinger | ............... | B60G 15/068 |
| 10,252,592 B2* | 4/2019 | Giaier | ............... | B60G 3/06 |
| 10,526,017 B2* | 1/2020 | Grattan | ............... | B62D 21/152 |
| 2015/0084322 A1* | 3/2015 | Killian | ............... | B60R 19/14 |
| | | | | 280/784 |
| 2019/0225271 A1* | 7/2019 | Klinger | ............... | B62D 21/15 |

FOREIGN PATENT DOCUMENTS

| | | |
|---|---|---|
| JP | 4164864 B2 | 8/2008 |
| JP | 2013256266 A | 12/2013 |

* cited by examiner

SUSPENSION SYSTEM INCLUDING RELEASABLE CONNECTION

BACKGROUND

During an offset frontal impact of a vehicle, the direction the impact is offset from major structural components of the vehicle. Offset front impacts can be simulated with a small offset rigid barrier (SORB) frontal crash test. For example, the Insurance Institute for Highway Safety (IIHS) sets a standard for a SORB frontal crash test in which the vehicle impacts a rigid barrier at 40 miles/hour with 25% of an outer portion of the vehicle overlapping the rigid barrier.

During the front impact, the wheel may rotate relative to a suspension arm, e.g., about a king pin axis or a steering axis, to a position in which the wheel is oriented with a front portion of the wheel being positioned outboard relative to a rear portion of the wheel. In this position, the wheel may be trapped between a bumper beam of the vehicle, the suspension arm, and a rear of a wheel well of the vehicle. As the bumper beam moves toward the rear of the wheel well, the bumper and/or other components of the vehicle may force the wheel to intrude into a passenger compartment of the vehicle, e.g., through a floor or dash of the vehicle. Intrusion of the wheel into the floor or dash of the vehicle is a metric recorded in the IIHS SORB frontal crash test.

DETAILED DESCRIPTION

Figure 1:
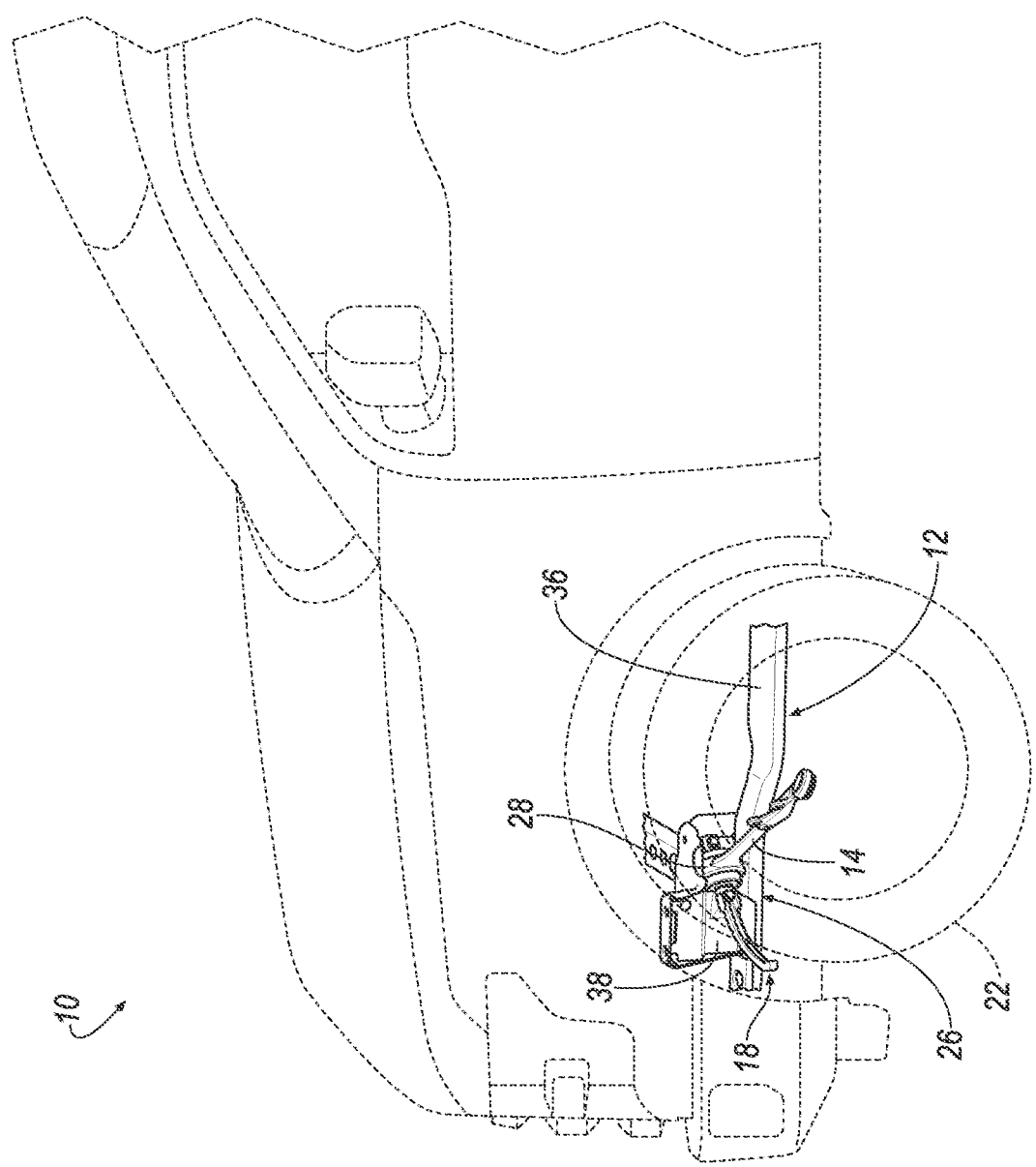
FIG. 1 is a perspective view of a portion of a vehicle including a suspension system.

A vehicle includes a vehicle frame, a suspension arm, and a bushing connected to the suspension arm. A lever extends through the bushing. A fastener is fastened to the lever and the vehicle frame.

The vehicle may include a second fastener fastened to the lever and the vehicle frame. The lever may include a round hole receiving the fastener and a slot receiving the second fastener. The round hole may be vehicle-outboard relative to the slot. The lever may include an end cantilevered from the vehicle frame in a vehicle-outboard direction. The bushing may be between the fastener and the second fastener.

The fastener may be frangible relative to the lever.

The lever may include an end cantilevered from the vehicle frame in a vehicle-forward position relative to the suspension arm.

The lever may include an end cantilevered from the vehicle frame in a vehicle-outboard direction.

The vehicle may include a wheel coupled to the suspension arm.

The fastener may be configured to break before the lever and the bushing when the lever is impacted by a small-offset rigid-barrier during a small-offset rigid-barrier frontal crash test.

The lever may be configured to be impacted before the suspension arm by a small-offset rigid-barrier during a small-offset rigid-barrier frontal crash test.

A vehicle suspension system may include a suspension arm, a bushing connected to the suspension arm, and a lever extending through the bushing. The lever defines a fastener hole spaced from the bushing.

The lever may define a second fastener hole spaced from the bushing.

The fastener hole may be round and the second fastener hole is elongated.

The bushing may be between the fastener hole and the second fastener hole.

With reference to the Figures, wherein like numerals indicate like parts throughout the several views, a vehicle 10 includes a vehicle frame 12 and a suspension arm 14. A bushing 16 is connected to the suspension arm 14. A lever 18 extends through the bushing 16. A fastener 20 is fastened to the lever 18 and the vehicle frame 12.

Figure 2:
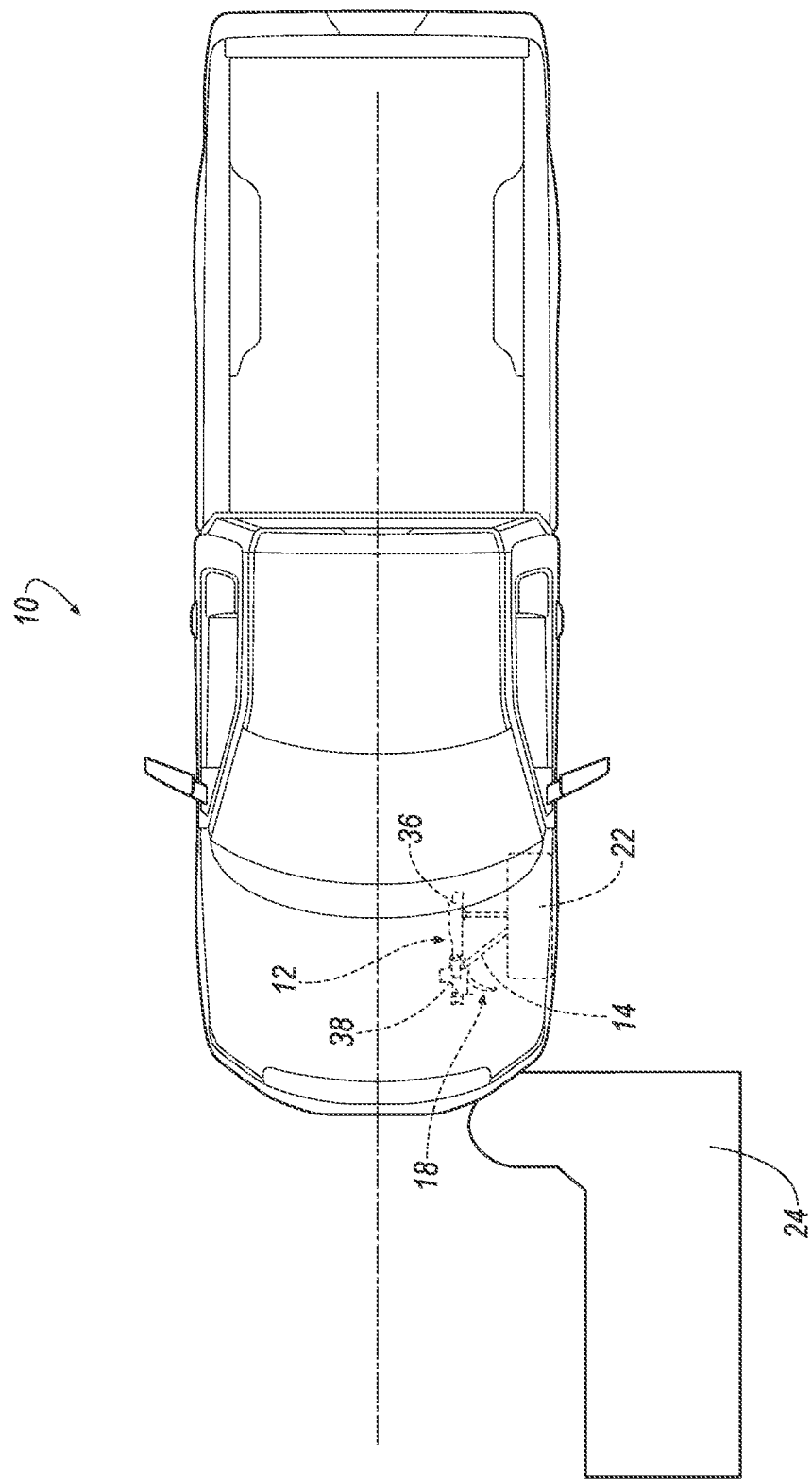
FIG. 2 is a plan view of the vehicle during a small-offset rigid-barrier (SORB) frontal impact test.

During an impact of the vehicle 10, e.g., a small-offset rigid-barrier (SORB) frontal crash test as shown in FIG. 2, the lever 18 is impacted and breaks the fastener 20 to release the lever 18, the bushing 16, and the suspension arm 14 from the vehicle frame 12. This reduces the likelihood of intrusion of a wheel 22 coupled to the suspension arm 14 into the occupant cabin of the vehicle 10 during the SORB frontal crash test. Specifically, the lever 18, the bushing 16, and the suspension arm 14 remain connected to each other when the fastener 20 breaks such that impact on the lever 18 is driven through the bushing 16 and the suspension arm 14 to the wheel 22. Thus, the force of the rigid barrier 24 of the SORB frontal crash test drives the wheel 22 in a vehicle-rearward direction through the lever 18, the bushing 16, and the suspension arm 14.

With reference to FIGS. 1 and 2, the vehicle 10 may be of any suitable type, e.g., a passenger automobile such as a car, truck, sport-utility vehicle, etc. The vehicle frame 12 may be of a body-on-frame construction (also referred to as a cab-on-frame construction). In such an example, a body of the vehicle 10 and the vehicle frame 12 are separate components, i.e., are modular, and the body is supported on and affixed to the vehicle frame 12. As another example, the vehicle frame 12 may be of a unibody construction, i.e., a unitary-body construction. In the unibody construction, the body, e.g., rockers, rails, etc., serves as the vehicle frame 12, and the body (including the rockers, pillars, roof rails, etc.) is unitary, i.e., a continuous one-piece unit. In the unibody construction, the vehicle frame 12 may include a subframe that supports, for example, an engine and other components. Alternatively, the vehicle frame 12 and the body may have any suitable construction. The vehicle frame 12 and/or the body may be formed of any suitable material, for example, steel, aluminum, etc.

With continued reference to FIGS. 1 and 2, the vehicle 10 includes a suspension system 26 including the suspension arm 14, the bushing 16, and the lever 18. The suspension system 26 may be, for example, a MacPherson suspension system, a short-arm and long-arm suspension system (SLA), or any other suitable type of suspension system. For example, the suspension system 26 shown in the Figures is of the MacPherson type. The suspension system 26 is a front suspension system. In other words, the wheel 22 is a front wheel and the suspension system 26. The suspension system 26 shown in the figures is on the left side of the vehicle 10, and the suspension system 26 may be on the right side of the vehicle 10.

The suspension arm 14 pivots relative to the vehicle frame 12, i.e., up and down, to allow the wheel 22 to travel relative to the vehicle frame 12. Specifically, the suspension arm 14 pivots relative to the vehicle frame 12 about the bushing 16. The suspension arm 14 may be, for example, a control arm. For example, the suspension arm 14 may be a lower control arm of a MacPherson suspension system (as shown in the Figures) or a lower control arm of an SLA suspension system. The suspension arm 14 may include one point of attachment to the vehicle frame 12, i.e., at the bushing 16, as shown in the figures. In other examples, the suspension arm 14 may include more than one point of attachment to the vehicle frame 12, e.g., having an A-shape, sometimes referred to as an A-arm. In an example where the suspension arm 14 includes more than one point of attachment, the lever 18 may be at the front-most point of attachment. The suspension system 26 may include other components, e.g., another lower control arm (as shown in FIG. 2), an upper control arm, a strut, a strut, etc.

The suspension system 26 may include a steering knuckle (not numbered) connected to the suspension arm 14. The wheel 22 is mounted to the steering knuckle. A steering arm (not shown) engages the steering knuckle to turn the steering knuckle to steer the wheel 22, as is known. The wheel 22 is coupled to the steering arm. In other words, the steering arm directly or indirectly interacts with the wheel 22 to control the wheel 22. In the example in the figures, the steering arm steers the wheel 22 through the steering knuckle.

The suspension arm 14 is coupled to the vehicle frame 12, i.e., directly or indirectly connected to the vehicle frame 12 and supported by the vehicle frame 12. The suspension arm 14 is rotatably engaged with the vehicle frame 12. Specifically, the bushing 16 is between the suspension arm 14 and the vehicle frame 12 to allow rotation of the suspension arm 14 relative to the vehicle frame 12.

Figure 3:
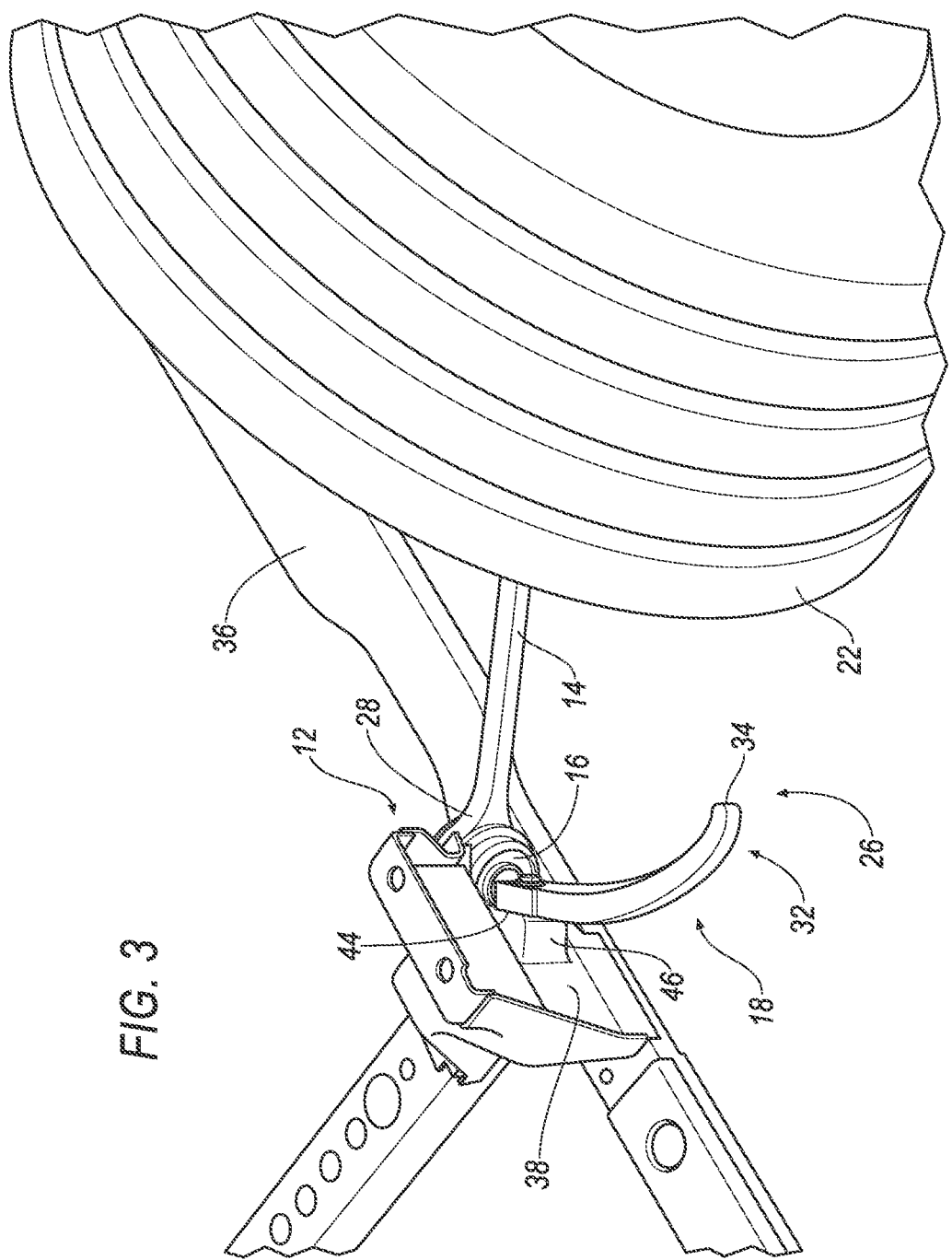
FIG. 3 is a perspective view of a portion of the suspension system connecting a wheel to a vehicle frame.
Figure 4:
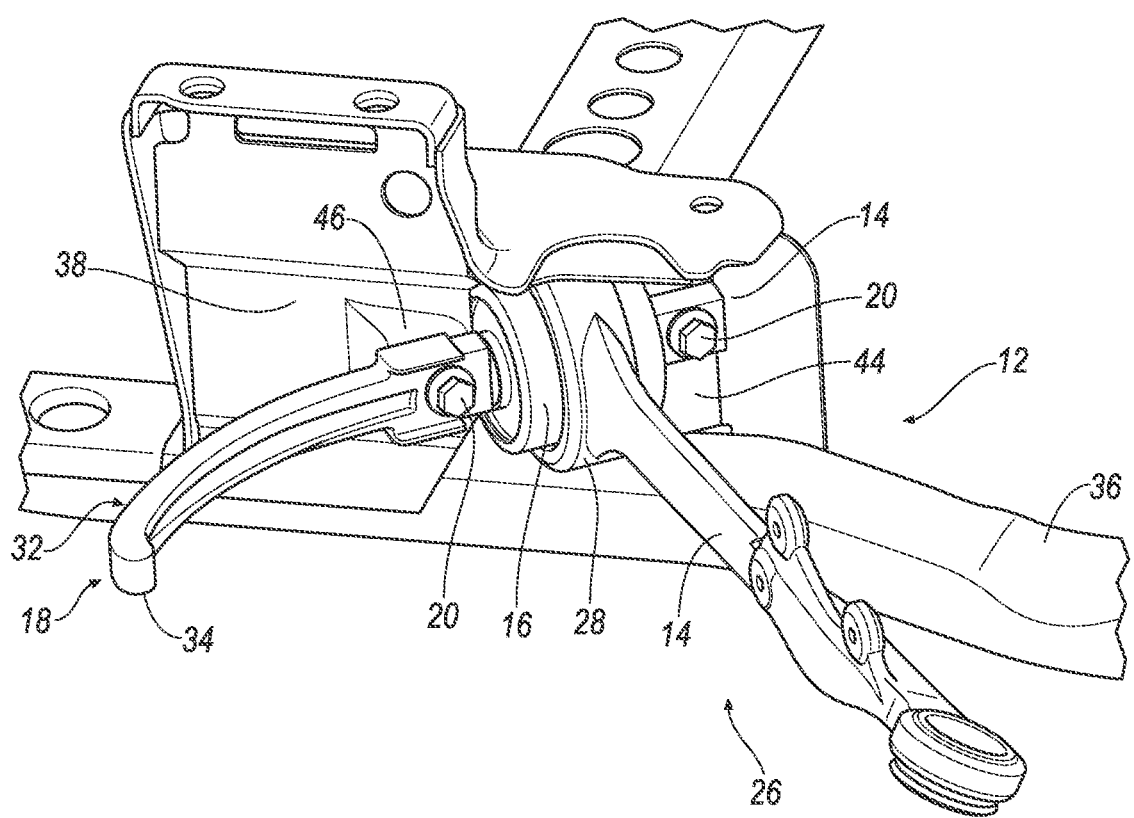
FIG. 4 is a perspective view of a portion of the suspension system on the vehicle frame.
Figure 5:
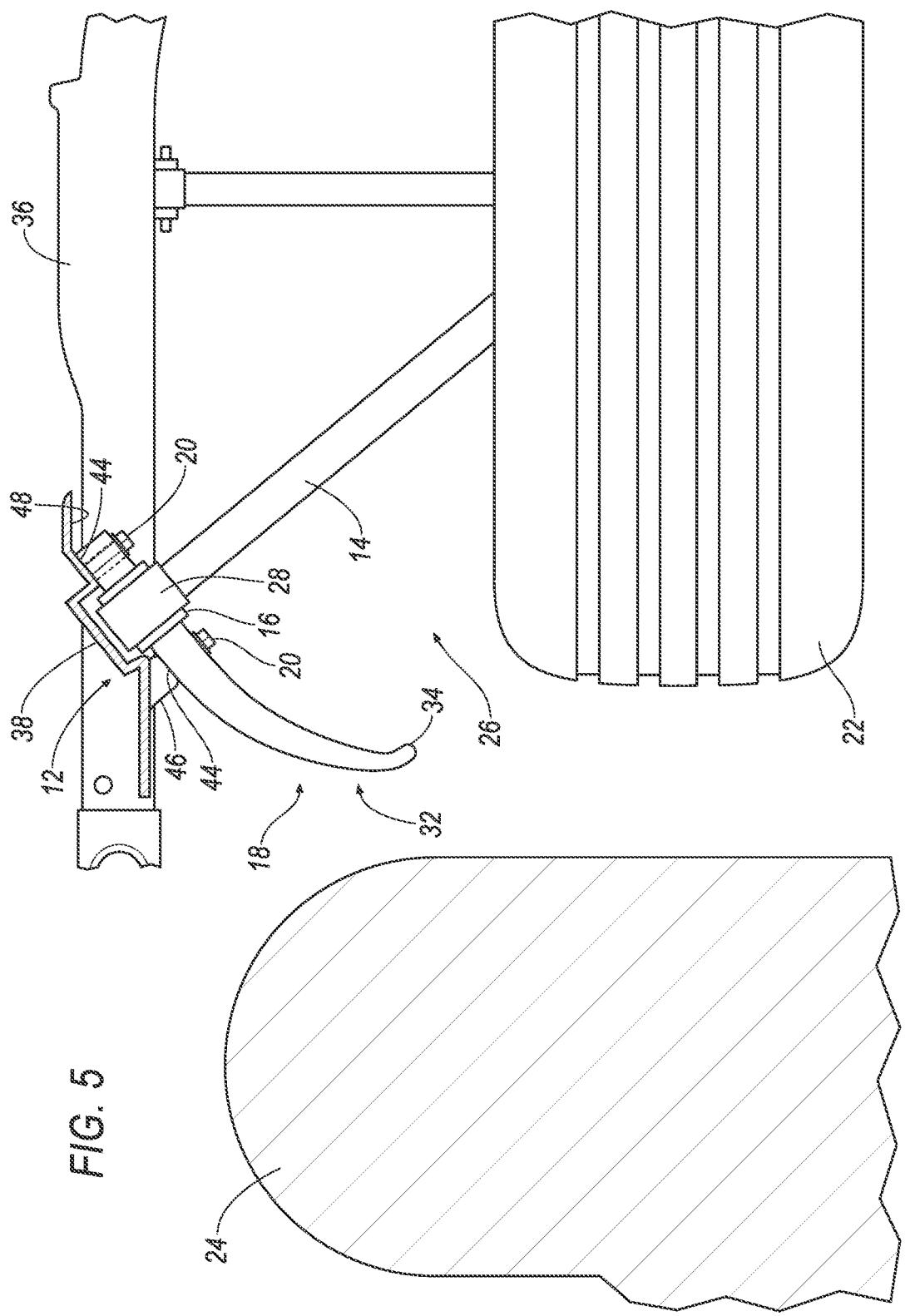
FIG. 5 is a top view of a portion of the suspension system on the vehicle frame at an initial stage of a SORB frontal impact test.

With reference to FIGS. 3 and 4, the bushing 16 is connected to the suspension arm 14 and to the lever 18. As an example, the suspension arm 14 may include a ring 28 and the bushing 16 is engaged with the ring 28. The bushing 16 is rotatable relative to the suspension arm 14 and/or the lever 18 to allows the suspension arm 14 to rotate relative to the vehicle frame 12. The bushing 16, for example, may include bearings that allow for the rotation of the suspension arm 14 relative to the vehicle frame 12.

Figure 8:
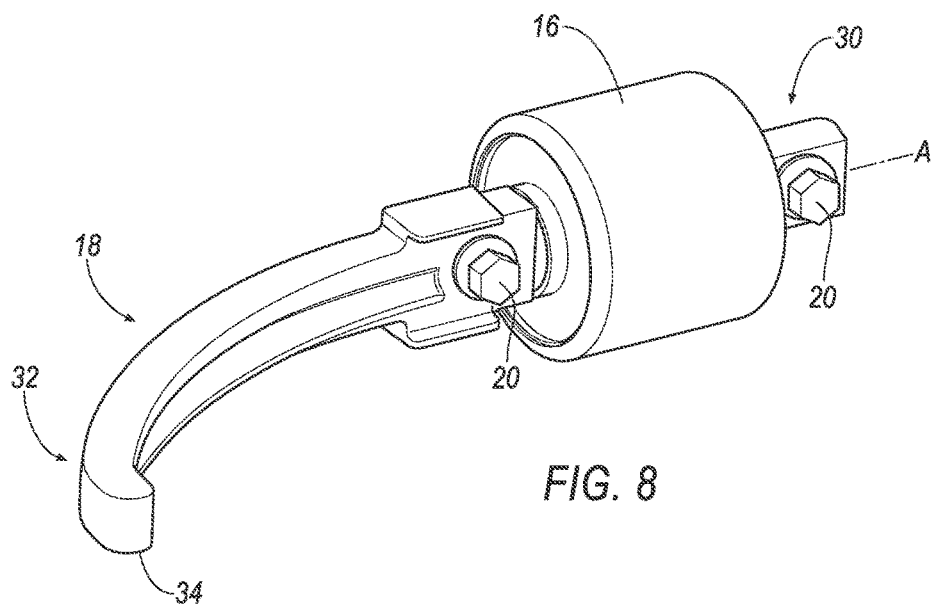
FIG. 8 is a perspective view of a lever, a bushing, and fasteners of the suspension system.
Figure 9:
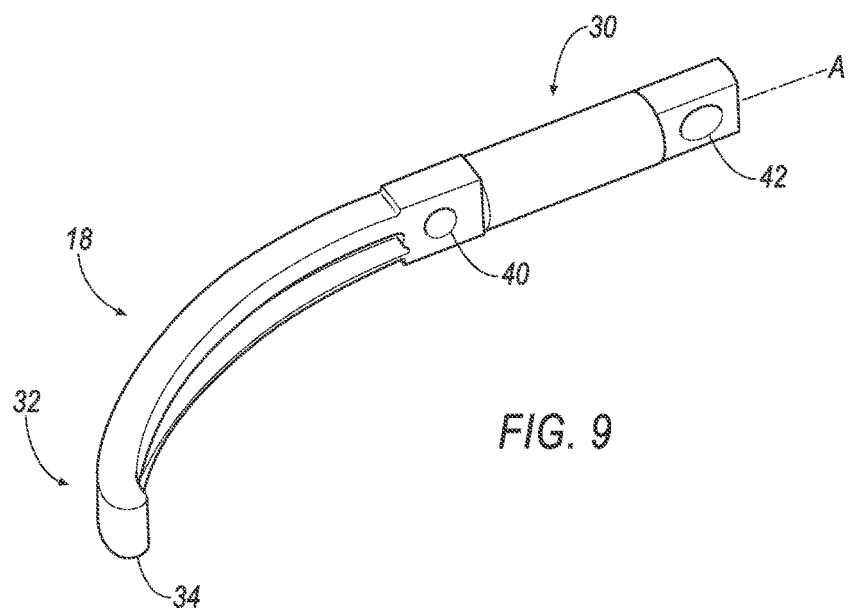
FIG. 9 is a perspective view of the lever.

With reference to FIGS. 8 and 9, the lever 18 includes a bushing end 30 and a cantilevered end 32. The bushing end 30 engages the bushing 16 and the cantilevered end 32 is cantilevered from the vehicle frame 12, as described below. In other words, the cantilevered end 32 is fixed only at one end, i.e., at the bushing end 30, and is elongated away from the bushing end 30 to a distal terminus 34. The bushing end 30 may be straight, i.e., may be symmetrical about an axis A. The cantilevered end 32 may curve. For example, the cantilevered end 32 may curve from the bushing end 30 to the distal terminus 34.

The lever 18 extends from the bushing 16 and away from the vehicle frame 12. The lever 18 is impacted during a SORB frontal crash test and releases the lever 18, the bushing 16, and the suspension arm 14 from the vehicle frame 12 when impacted during a SORB frontal crash test, as described above and further below. Specifically, the cantilevered end 32 is cantilevered from the vehicle frame 12 in a vehicle outboard direction.

The lever 18 is configured to be impacted before the suspension arm 14 by the rigid barrier 24 during SORB frontal crash test. In other words, the lever 18 is positioned and shaped such that the cantilevered end 32 is impacted, directly or indirectly, but the rigid barrier 24 before the rigid barrier 24 directly or indirectly impacts the suspension arm 14. The cantilevered end 32 is in a vehicle 10-forward position relative to the suspension arm 14. The cantilevered end 32 is impacted during the SORB frontal crash test and leverages against the vehicle frame 12 and the fastener 20 to break the fastener 20, as described further below. Since the cantilevered end 32 is impacted before the suspension arm 14, the lever 18 breaks the fastener 20 and the lever 18, the bushing 16, and the suspension arm 14 away from the vehicle frame 12 while maintaining the connection between the lever 18, the bushing 16, and the suspension arm 14.

As set forth above, the lever 18 extends through the bushing 16. For example, the bushing 16 includes a bore (not numbered) and the lever 18 extends through the bore. As an example, the lever 18 may be press-fit in the bore and/or may be fixed to the bushing 16 in any suitable fashion.

The vehicle frame 12 may include a frame rail 36 and the lever 18 is supported by the frame rail 36. As an example shown in the figures, the vehicle frame 12 includes a brace 38 fixed to the frame rail 36 and the lever 18 is fastened to the brace 38. Specifically, the bushing end 30 of the lever 18 is fastened to the brace 38.

As set forth above, the lever 18 is fastened to the vehicle frame 12 with the fastener 20. Specifically, the fastener 20 extends through the lever 18 and engages the vehicle frame 12. The lever 18, e.g., the bushing end 30, may define a fastener hole 40, 42 that receives the fastener 20. The fastener 20 threadedly engages the vehicle frame 12, e.g., at weld nuts. Specifically, the fastener 20 may threadedly engage the brace 38. The fasteners 20 may be, for example, a bolt. The bolt includes a shaft, that may be threaded, and a head fixed to the shaft.

As an example, the lever 18 may be fastened to the vehicle frame 12 with two fasteners 20. In such an example, the bushing end 30 of the lever 18 defines two fastener holes 40, 42 receiving the fasteners 20, respectively. In the example shown in the figures, the bushing 16 is between the fastener holes 40, 42 and the fastener holes 40, 42 are spaced from the bushing 16. Said differently, the bushing 16 is between the fasteners 20 when fastened to the vehicle frame 12. The bushing end 30 being straight and the cantilevered end 32 being cantilevered from the bushing end 30 results in the lever 18 leveraging against the fasteners 20 to impart axial tension on the fasteners 20. This breaks the fasteners 20 to release the lever 18, the bushing 16, and the suspension arm 14 from the vehicle frame 12.

Figure 6:
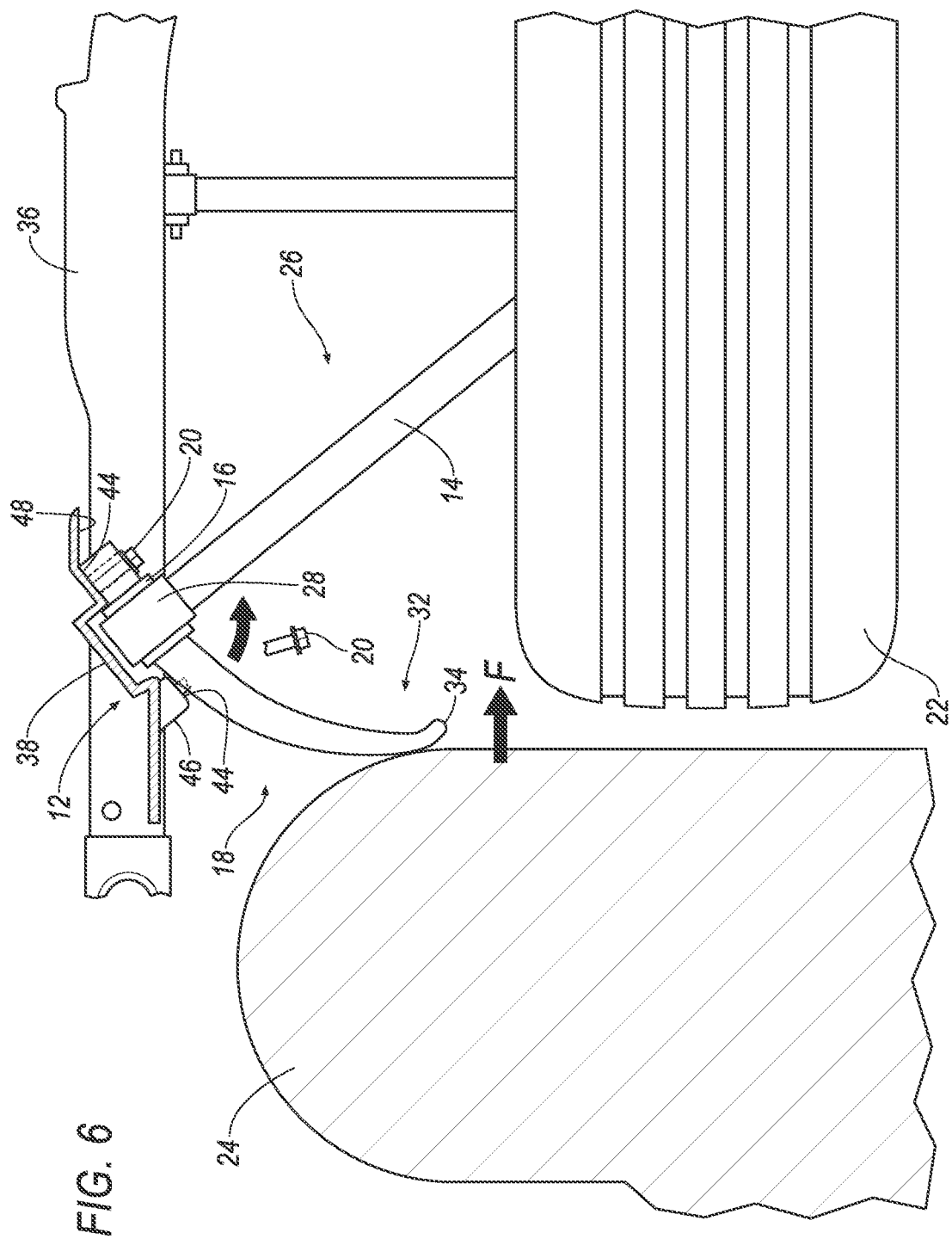
FIG. 6 is the top view of FIG. 5 at a later stage of the SORB frontal impact test.
Figure 7:
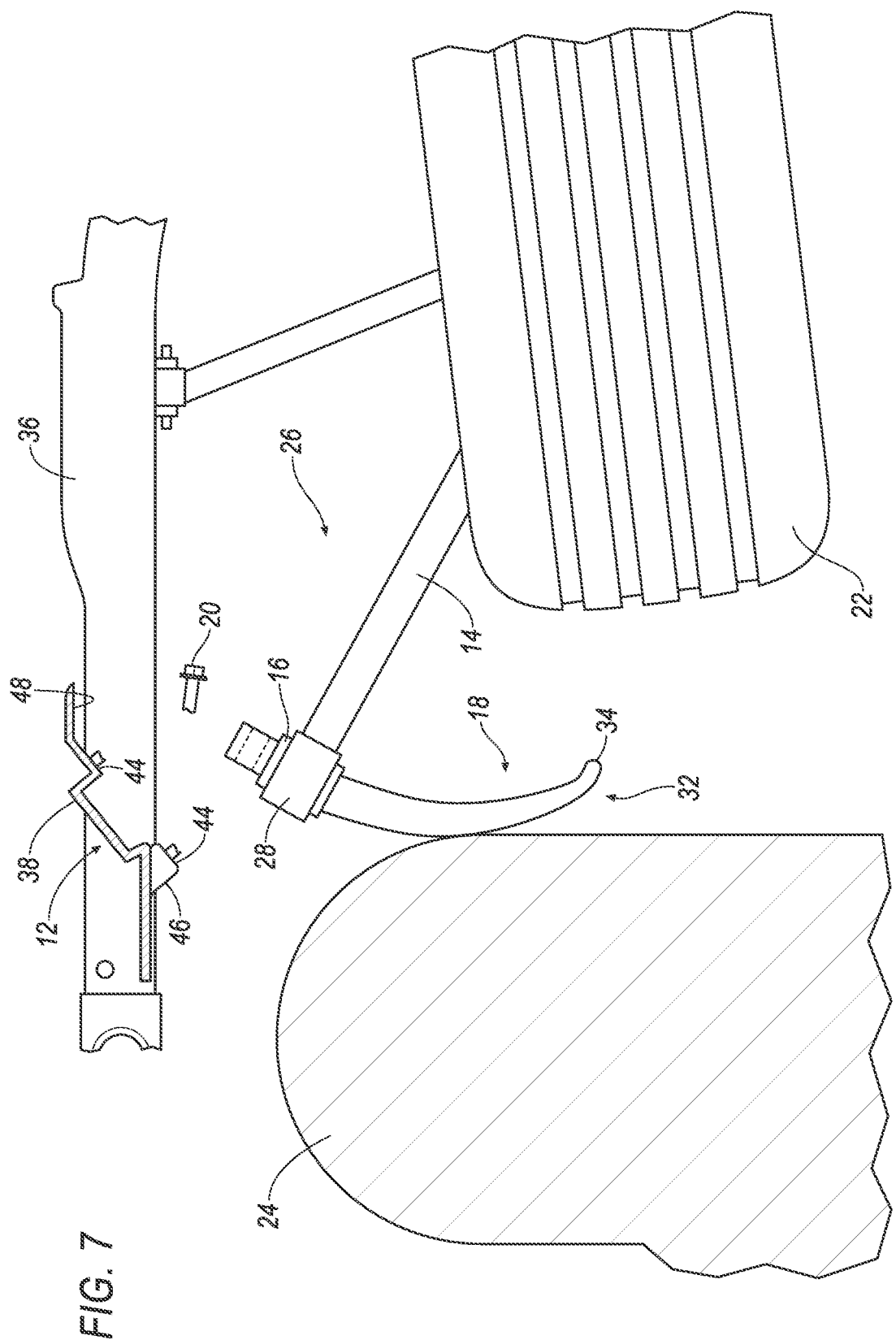
FIG. 7 is the top view of FIG. 5 at a later stage of the SORB frontal impact test with a suspension arm released from the vehicle frame.

The fastener hole 40, 42 may be round or a slot, i.e., elongated. For example, the lever 18 shown in the figures, one of the holes 40 is round and the other hole 42 is elongated. The hole 42 that is elongated is elongated along the axis A of the bushing end 30 of the lever 18. The hole 40 that is round is vehicle outboard relative to the hole 42 that is elongated. When the lever 18 is impacted during the SORB frontal crash test, the cantilevered end 32 leverages against the fastener 20 in the hole 40 that is round and the lever 18 is able to slide relative to the fastener 20 in the hole 42 that is elongated. Accordingly, greater force is applied to the fastener 20 in the hole 40 that is round and that fastener 20 breaks first, as shown in FIG. 6. As force is continued to be applied to the lever 18, additional force is applied to the fastener 20 in the hole 42 that is elongated until that fastener 20 breaks, as shown in FIG. 7.

The vehicle frame 12, e.g., the brace 38, may include flat surfaces 44 that abut the bushing end 30 of the lever 18 to allow the lever 18 to slide as the fastener 20 moves in the hole 42 that is elongated. As an example, the brace 38 may include a ramp 46 to position the lever 18.

The vehicle frame 12, e.g., the brace 38, may include a stop 48 adjacent the bushing end 30 inboard of the bushing end 30. As the lever 18 slides relative to the fastener 20 in the hole 42 that is elongated, the lever 18 abuts the stop 48 causing the lever 18 to rotate about the stop 48 and apply tension to the fastener 20, as shown in FIG. 6. The curve of the cantilevered end 32 of the lever 18 also encourages the rotation of the lever 18 about the stop 48.

The fasteners 20 are frangible relative to the lever 18, the bushing 16, and the suspension arm 14. For example, the fasteners 20 are configured to break before the lever 18, the bushing 16, and the suspension arm 14 when the lever 18 is impacted by a rigid barrier 24 during a SORB frontal crash test. Accordingly, the fasteners 20 release to allow the lever 18, the bushing 16, and the suspension arm 14 to move as a unit as the rigid barrier 24 of the SORB frontal crash test imparts force on the lever 18.

Specifically, the fasteners 20 are frangible relative to the lever 18 and relative to the connections between the lever 18, the bushing 16, and the suspension arm 14 such that the lever 18 is released from the vehicle frame 12 while the bushing 16 remains intact. Specifically, when the lever 18 is impacted by the rigid barrier 24 of the SORB frontal crash test, the suspension arm 14 is released from the vehicle frame 12 by the breaking of the fasteners 20, and the bushing 16 remains intact without breaking and the connections between the lever 18, the bushing 16, and the suspension arm 14 remain intact without breaking during the breaking of the fasteners 20 and separation of the lever 18 from the vehicle frame 12. The separation of the fasteners 20 results in the driving force of the rigid barrier 24 of the SORB frontal test through the lever 18, the bushing 16, and the suspension arm 14 to the wheel 22 to guide the wheel 22 rearwardly to reduce the likelihood that the wheel 22 intrudes inwardly into the occupant cabin of the vehicle 10. In other words, after the fasteners 20 break, a force path is established from the rigid barrier 24 to the wheel 22 through the lever 18, the bushing 16, and the suspension arm 14 so that force applied by the rigid barrier 24 to the lever 18 is transferred to the wheel 22.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a vehicle frame;
a suspension arm;
a bushing connected to the suspension arm;
a lever extending through the bushing; and
a fastener fastened to the lever and the vehicle frame.

2. The vehicle as set forth in claim 1, further comprising a second fastener fastened to the lever and the vehicle frame.

3. The vehicle as set forth in claim 2, wherein the lever includes a round hole receiving the fastener and a slot receiving the second fastener.

4. The vehicle as set forth in claim 3, wherein the round hole is vehicle-outboard relative to the slot.

5. The vehicle as set forth in claim 4, wherein the lever includes an end cantilevered from the vehicle frame in a vehicle-outboard direction.

6. The vehicle as set forth in claim 3, wherein the bushing is between the fastener and the second fastener.

7. The vehicle as set forth in claim 2, wherein the bushing is between the fastener and the second fastener.

8. The vehicle as set forth in claim 1, wherein the fastener is frangible relative to the lever.

9. The vehicle as set forth in claim 1, wherein the lever includes an end cantilevered from the vehicle frame in a vehicle-forward position relative to the suspension arm.

10. The vehicle as set forth in claim 1, wherein the lever includes an end cantilevered from the vehicle frame in a vehicle-outboard direction.

11. The vehicle as set forth in claim 1, further comprising a wheel coupled to the suspension arm.

12. The vehicle as set forth in claim 1, wherein the fastener is configured to break before the lever and the bushing when the lever is impacted by a small-offset rigid-barrier during a small-offset rigid-barrier frontal crash test.

13. The vehicle as set forth in claim 1, wherein the lever is configured to be impacted before the suspension arm by a small-offset rigid-barrier during a small-offset rigid-barrier frontal crash test.

14. A vehicle suspension system comprising:
a suspension arm;
a bushing connected to the suspension arm; and
a lever extending through the bushing, the lever defining a fastener hole spaced from the bushing.

15. The vehicle suspension system as set forth in claim 14, wherein the lever defines a second fastener hole spaced from the bushing.

16. The vehicle suspension system as set forth in claim 15, wherein the fastener hole is round and the second fastener hole is elongated.

17. The vehicle suspension system as set forth in claim 15, wherein the bushing is between the fastener hole and the second fastener hole.

* * * * *